Figure 1:
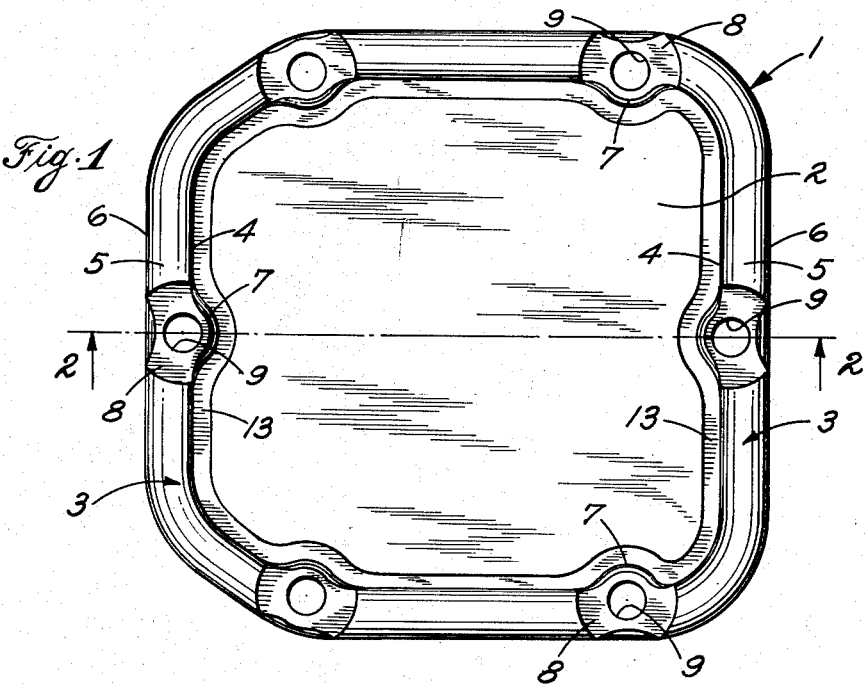

Nov. 30, 1954  H. B. CHATFIELD  2,695,725
ACCESS PLATE

Filed Jan. 8, 1951  3 Sheets-Sheet 1

INVENTOR.
HENRY B. CHATFIELD
BY
Bosworth & Sessions
ATTORNEYS

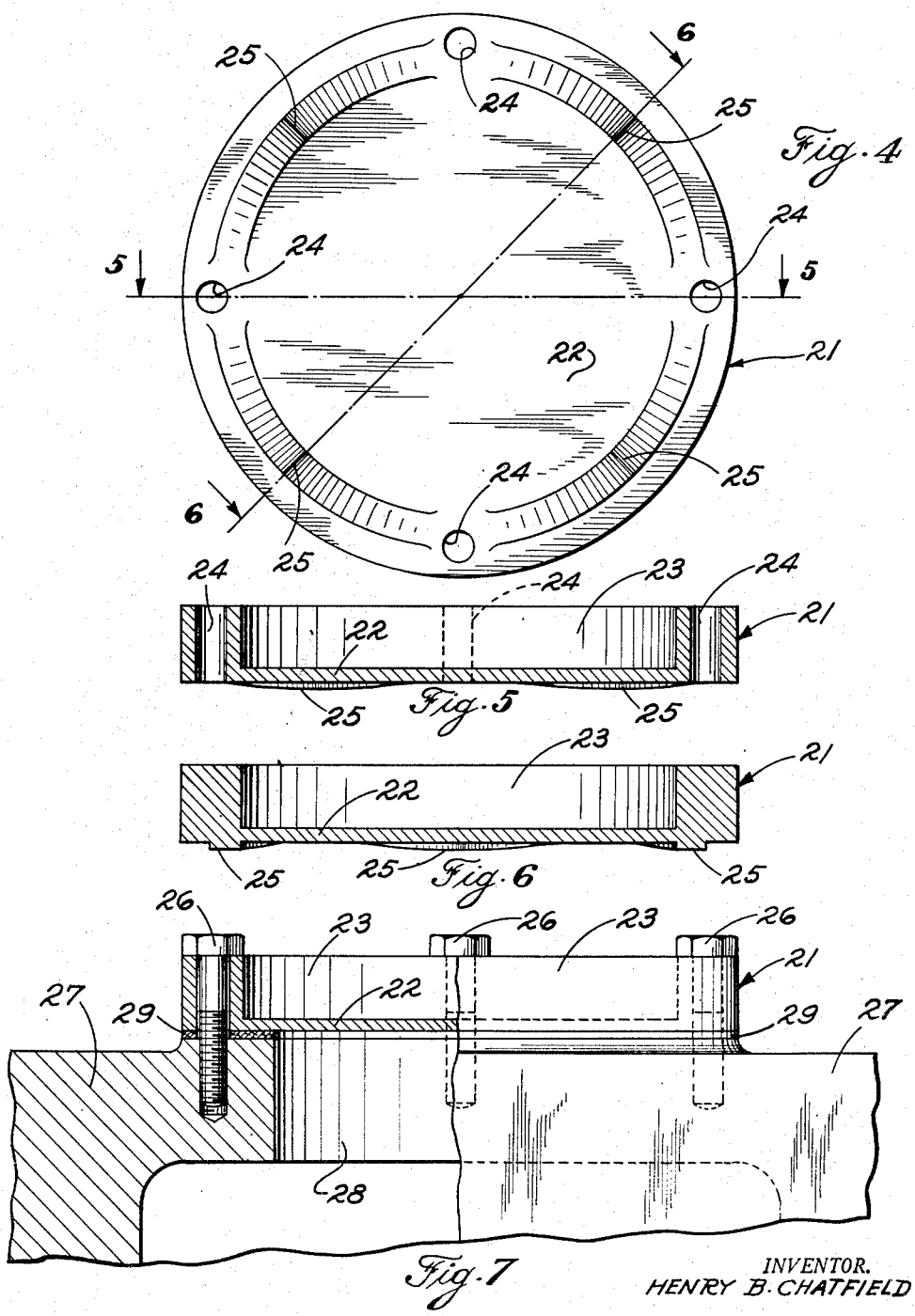

Nov. 30, 1954     H. B. CHATFIELD     2,695,725
ACCESS PLATE
Filed Jan. 8, 1951     3 Sheets-Sheet 3
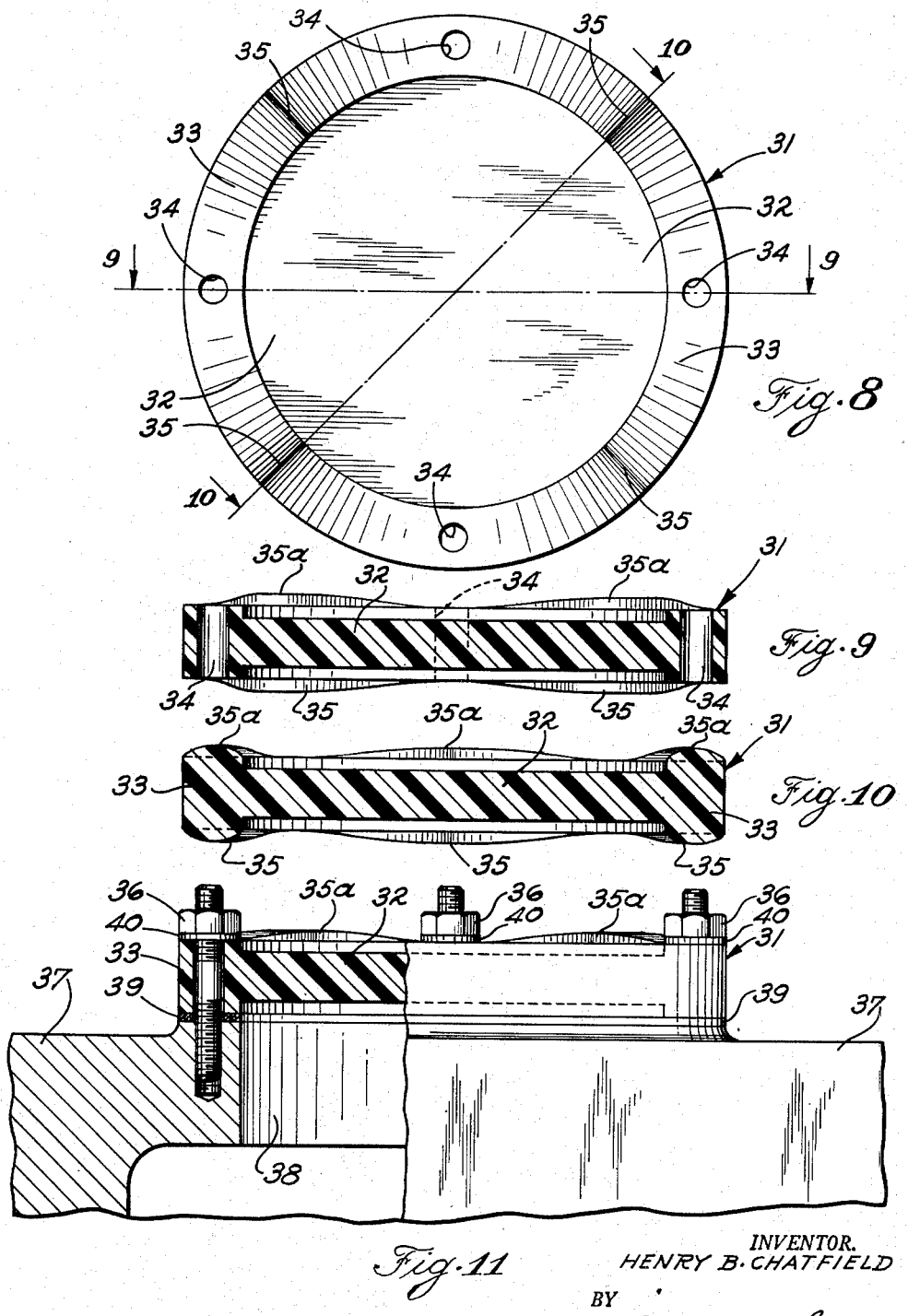
INVENTOR.
HENRY B. CHATFIELD
BY
*Bosworth & Sessions*
ATTORNEYS

United States Patent Office 2,695,725
Patented Nov. 30, 1954

2,695,725
ACCESS PLATE
Henry B. Chatfield, Kinsman, Ohio

Application January 8, 1951, Serial No. 204,989

9 Claims. (Cl. 220—46)

This invention relates to access plates for gear boxes, transmission housings, pumps, reactors, pressure vessels and similar movable and immovable units making use of housings in which a tight seal is desired between the housing and the access plate.

Heretofore, access plates for these purposes have ordinarily been made of malleable iron, steel, etc. In addition to being heavy, such plates have the disadvantage of requiring extensive machining, particularly on their seating surfaces; that is to say, those surfaces which overlie the edges of the access opening in the housing but as a rule are separated from them by a thin gasket and by which, with the aid of conventional fastening elements, the access plate is located and held in place on the housing. In general, the usual practice has been to machine the seating surfaces to within one or two thousandths of an inch of flatness, particularly for installations wherein leakage to or from the interior of the housing cannot be countenanced.

Even where so high a degree of accuracy characterizes the seating surface of a finished access plate, the pressure developed along the seating surface when the access plate is applied to the housing is highly variable. Thus in those zones in which fastening elements urge the access plate toward the housing, a particularly high pressure is developed. On the other hand, in the stretches between fastening elements, the pressure is substantially less. Even where the material of the access plate has considerable inherent resilience, there is always greater likelihood of leakage mid-way between fastening elements, this because the forces urging the access plate toward the housing tend to be localized around the fastening elements.

It is an object of the present invention to provide access plates that will give a high measure of sealing action even when substantial pressure differentials must be resisted. It is a further object of the invention to provide an access plate which, when used with the housing and for the purposes for which it is intended, is characterized by substantially a constant pressure along the seating surface. It is a further object of the invention to modify the contour of the seating surface, particularly between fastening elements, in a manner such that the pressure mid-way between fastening elements, taken before manufacturing tolerances, is at least as great as if not greater than that obtaining elsewhere along the seating surface. Other objects of the invention will be apparent from the description which follows and from the accompanying drawings, which illustrate three forms that the invention may take.

Figure 2:
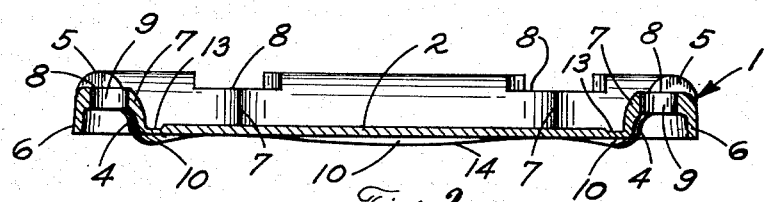
Figure 3:
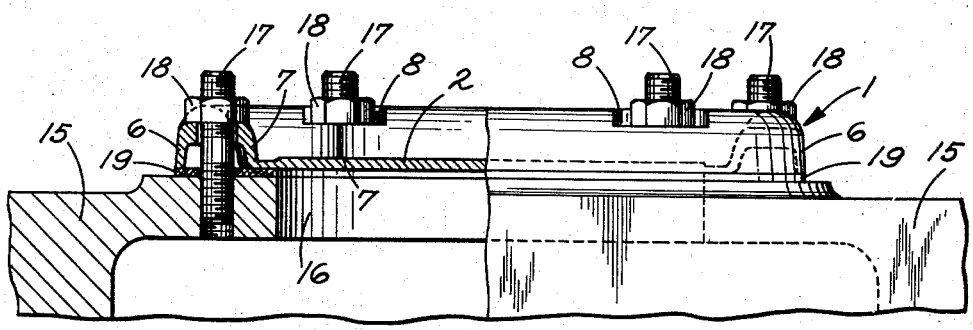

In the drawings, Figure 1 is a top plan of a stamped metal access plate incorporating features of the present invention. Figure 2 is a sectional elevation looking in the direction of the arrows from line 2—2 of Figure 1. Figure 3 is a view partly in vertical central section and partly in side elevation of the access plate of Figures 1 and 2 when applied to the top of a gear box. Figure 4 is a bottom plan of a different type of access plate, made by a die-casting operation, in which the features of the invention are incorporated. Figures 5 and 6 are sectional elevations as seen from lines 5—5 and 6—6, respectively, of Figure 4. Figure 7 is a view partly in vertical central section and partly in elevation of the access plate of Figures 4, 5 and 6 as applied to a gear box. Figure 8 is a bottom plan of still another type of access plate within the purview of the invention, such access plate being molded from synthetic resin. Figures 9 and 10 are sectional elevations as seen from lines 9—9 and 10—10, respectively, of Figure 8. Figure 11 is a view partly in vertical central section and partly in elevation of the access plate of Figures 8, 9 and 10 as applied to a gear box.

The stamped-metal access plate of Figures 1 to 3 represents one of the forms that the invention may take. In addition to being shown, described and claimed generically in the present application, it is shown, described and specifically claimed in applicant's copending application Serial No. 204,990, filed January 8, 1951, for "Stamped Metal Access Plate for Gear Boxes." In the form of the invention illustrated in Figures 1 to 3, as in all of the herein described forms of the invention, the access plate is integrally formed and characterized by a seating surface provided with outwardly extending undulations, such undulations being of maximum over-all amplitude approximately midway between fastening elements.

In the stamped-metal access plate shown in Figures 1 to 3, the access plate as a whole is generally designated 1. It consists, among other things, of a generally flat body portion 2 which, as shown, is polygonal in shape but which may be circular, rectangular, square or of any other desired shape. Body portion 2 is surrounded by an encompassing channel-like structure 3 that is generally U-shaped in cross section and characterized by an inner wall 4 rising abruptly from body portion 2, an intermediate portion 5 extending outward in a manner permitting it to serve as the bottom portion or base of the channel-like encompassing structure, and an outer wall 6 paralleling inner wall 4. The entire access plate, including the channel-like encompassing structure, is formed from a flat blank by subjecting the blank to the action of cooperating male and female dies.

The stamped-metal access plate of Figures 1 to 3 is provided at intervals around the channel-like structure 3 encompassing body portion 2 with a plurality of locating bosses 7. Bosses 7, which are formed in inner wall 4, project toward the center of the access plate in the manner most clearly shown in Figure 1. Outwardly of bosses 7, flat portions 8 ("flats") are formed in intermediate portion 5 of channel-like structure 3. More than one way of attaching the access plate to the housing is available, but preferred practice involves the introduction into channel-like structure 3 of openings of suitable size and shape such, for example, as circular holes 9. Such holes, which are located in the geometrical centers of flats 8, are for the purpose of accommodating studs, bolts or the like.

Where inner wall 4 joins or impinges on base portion 2, downwardly bowed portions 10 of smoothly faired contour are formed between adjoining bosses 7 in what may be considered to be the edge of inner wall 4 of the encompassing structure. Such downwardly bowed portions ordinarily have a radius of curvature so great that the convexity is almost imperceptible to the eye. Nevertheless, viewed in elevation, each presents the general shape of a shallow catenary or like curve. Convex portions 10, which appear in exaggerated fashion in Figure 2, ordinarily have a maximum height of more than about 0.001 but less than about 0.090 inch, measured from the proximate plane of body portion 2. The precise value, which is a function of the pressure to be retained, the distances between fastening elements and the nature of the fastening elements themselves, should be less than that amount which would give rise to permanent flattening as a result of the imposition of forces exceeding the elastic limit of the metal upon application of the fastening elements to the access plate.

The result of providing convex portions 10 is to form a series of shallow undulations in what may be regarded as the edge of inner wall 4 of the encompassing structure. Such undulations are of maximum over-all amplitude, measured from the proximate plane of body portion 2, mid-way between each two adjoining bosses 7. In consequence of the fact that the individual undulations are separated by bosses 7, if the series were developed on a flat surface, blunt cusps would be present between adjoining undulations. Accordingly, the series of undulations characterizing the edge of inner wall 4 may best be described as scalloped.

In the process of forming the access plate of Figures 1 to 3, a coining operation is included so as to provide smooth seating surfaces on the lower face of the access plate. The tool used in the coining operation produces a groove 13 which in general parallels the channel-like encompassing structure at the base of inner wall 4. Such coining operation necessarily removes a small part of the convexity characterizing downwardly bowed portions 10. It should not be carried so far as to obliterate the convexity characterizing downwardly bowed portions 10. Enough convexity must remain so that, measured from the proximate plane of body portion 2, the convexity substantially exceeds the aggregate manufacturing tolerances on opposed portions of the housing, gasket, and access plate. By performing the coining operation after convex portions 10 have been formed, a smooth seating surface 14 is produced where inner wall 4 of the encompassing structure joins body portion 2.

The preferred type of access plate is of sheet steel of relatively heavy gauge; e. g., 13-gauge, and of one of the many compositions lending themselves to stamping and use in access plates of the kind described, although it may, if desired, be formed of suitable non-ferrous metal.

Figure 3 shows access plate 1 applied to a gear box 15 having an opening 16 through which access may be had to the interior of the gear box. Extending upward from gear box 15 are studs 17, such studs being located at intervals around the periphery of opening 16. The access plate is fitted to gear box 15 in such manner that studs 17 on gear box 15 project through holes 9 in flats 8 in the channel-like structure 3 encompassing body portion 2. Onto studs 17 are threaded nuts 18, the latter seating on flats 8. Between the access plate and gear box 15 is a gasket 19 of oil-impregnated kraft paper about 0.010 inch in thickness.

When access plate 1 is applied to gear box 15, the downwardly bowed portions 10 giving the seating surface of the access plate its undulatory appearance come into contact with gasket 19 where the overall amplitude of the undulations is greatest; i. e., mid-way of the stretches between bosses 7. At this stage, there is clearance or at least an absence of substantial pressure between gasket 19 and the portions of access plate 1 which immediately adjoin bosses 7. However, as nuts 18 are screwed home, the other portions of the access plate, including the portions in which bosses 7 are formed, come progressively into seating contact with the gasket. In the meanwhile, the metal of the access plate, by virtue of its ductility, accommodates itself to gear box 15, developing thereby a substantially uniform pressure around the periphery of access opening 16.

Thus the invention provides a stamped-metal access plate in which sealing contact with the gasket or, lacking a gasket, with the housing itself is established first approximately mid-way of the stretches between adjoining fastening elements. As the fastening elements are made tight, those portions of the access plate which do not make such contact initially; e. g., the portions of the access plate adjacent the fastening elements, are urged progressively into position, this being possible because of the inherent resilience of the metal itself. A substantially constant sealing pressure thus may be achieved and maintained along the entire sealing surface.

A comparable action may be provided in an access plate that is die-cast of an aluminum or aluminum-magnesium alloy (including alloys containing silicon) by incorporating in the seating portion of the access plate, for example, the access plate illustrated in Figures 4, 5, 6 and 7, suitably formed undulations analogous to those characterizing the seating portion of the stamped-metal access plate of Figures 1 to 3. In the embodiment of Figures 4, 5, 6 and 7, a circular access plate 21 has a central body portion 22 and an encompassing structure 23 of the nature of an upstanding peripheral flange. The latter has openings 24 formed at regular intervals for the purpose of accommodating the fastening elements; e. g., studs, bolts, or the like.

Between adjoining openings 24, the lower face of access plate 21, which is the face seen in Figure 4, has downwardly bowed convex portions 25 analogous to downwardly bowed portions 10 of access plate 1; however, instead of being found only where body portion 2 joins the edge of the inner wall of the encompassing structure, such convex portions 25 extend radially approximately half-way across the width of the flange-like encompassing structure. In the form shown, there are four highly exaggerated bowed portions 25, one between each two adjoining openings 24, all of which ordinarily are of an order of magnitude between about .001 and about .090 inch in over-all amplitude, measured from the proximate plane of body portion 22.

When, as indicated in Figure 7, access plate 21 is applied to a gear box 27 having an access opening 28, downwardly bowed portions 25 establish the initial contact with gasket 29, which occurs first approximately mid-way between adjacent openings 24. As bolts 26 are screwed into position, the pressure on the other portions of the encompassing structure, including the portions surrounding openings 24, increases as previously described until substantial uniformity is attained. The alloy of which access plate 21 is formed should be one that yields sufficiently to conform; e. g., it may be an alloy of one of the types known as Alloy 13, Alloy A13, Alloy 43, Alloy 85, Alloy 218, Alloy 360, Alloy A360, Alloy 380 and Alloy A380. If these or like alloys are employed, a substantially uniform pressure develops around the access plate 21 in consequence of the incorporation in the seating surface of the access plate of the downwardly bowed portions 25.

Figures 8, 9, 10 and 11 illustrate a different embodiment of the invention in which the access plate is made of a synthetic resin. In Figures 8 to 11, incl., the access plate as a whole is generally designated 31, has a generally flat body portion 32, and includes an encompassing structure designated 33. The latter projects equally above and below body portion 32, so that the access plate is symmetrical and, as will appear, reversible. At regular intervals around the encompassing structure 33 are formed openings 34, the same being provided to accommodate studs, bolts or other fastening elements.

As indicated in Figures 9 and 10, access plate 31 is characterized in the stretches between openings 34 by convex portions 35. Each of such convex portions 35 extends radially across the entire width of encompassing structure 33. Each has the general characteristics of a catenary but is of such shallowness in relation to its length; e. g., from .001 to .090 of an inch in depth, as to be scarcely perceptible. As indicated in Figures 9 and 10, wherein the convex portions appear in greatly exaggerated fashion, the configuration giving the undulatory aspect to the seating surface is repeated on the opposite side of access plate 31, where the convex portions are designated 35a. Thus the access plate is reversible.

Preferably the undulatory form of the seating surface is generally cycloidal, although a more or less sinusoidal form, if desired, may be incorporated in access plate 31 by giving a suitable shape to the molds employed in forming the access plate.

Access plate 31, like the access plates of Figures 1 to 3 and Figures 4 to 7, is shown in Figure 11 as applied to a gear box, such gear box 37 having an access opening 38 around which access plate 31 is to seat. Gasket 39 separates access plate 31 from gear box 37. Access plate 31 is held in place on gear box 37 by nuts 36 which cooperate with studs located at intervals around the access opening 38 in the gear box 37. Washers 40 may be used, if desired, between nuts 36 and the portions immediately surrounding openings 34.

Although a synthetic resin of the phenol-formaldehyde type is suitable for the purpose, particularly if laminated with fabric, paper or the like, it is feasible to employ instead synthetic resins of quite different types. Included are such cellulosic resins as cellulose acetate-butyrate, ethyl cellulose, etc. Such other resins as the melamine-formaldehyde resins, the polystyrene resins and the polyamide resins are also useful. If desired, particularly where the latter are employed, strengthening elements such as glass fibers, mascerated fiber, filaments of metal, etc. may be incorporated in the molding compound. Dimensional stability is an important attribute in the selection of the synthetic resin and the resins that have been named have such stability in high degree.

In each of the forms of the invention heretofore described, the encompassing structure is of a height greater than the maximum height of the intervening body portion. It is of course possible to have the body portion raised above or depressed below the encompassing structure. In each case, whatever may be the relation of the encompassing structure to the body portion, the invention provides an access plate in which sealing contact with the gasket or, lacking a gasket, with the housing itself is established first approximately mid-way of the stretches between adjoining fastening elements. If desired, however, the over-all amplitude of the undulations as measured from the body portion of the access plate can be increased to a point where the pressure, disregarding manufacture tolerances, is greater mid-way between fastening elements than elsewhere, this being the precise opposite of the condition that obtains in ordinary access plates of the kinds heretofore used.

Other changes than those described above may be made without departing from the inventive concept. Thus in the form of the invention shown in Figures 4 to 7, inclusive, the seating surface may extend radially all the way across the base of the encompassing structure rather than half way across as shown in Figure 4 of the drawings. Similarly, in the form of the invention shown in Figures 8 to 11, inclusive, the seating surface may, if desired, be confined to a strip near the inner limit of the encompassing structure, in which case it may or may not have a secondary radially extending convexity of the kind shown in cross section in Figure 10. Other modifications may be introduced by those skilled in the art to which the invention pertains.

It is intended that the patent shall cover, by summarization in the appended claims, whatever features of patentable novelty reside in the invention.

What is claimed is:

1. An access plate for a housing comprising a body portion; a seating portion on one side of the access plate near the periphery thereof, said seating portion being characterized by a series of longitudinally extending undulations each of which is smoothly faired into the undulations preceding and following it in the series; a backing flange on the opposite side of the access plate, portions of said backing flange overlying the undulations in the seating portion of the access plate; and, formed in the body of the backing flange, means accommodating the fastening elements used in holding the access plate in place on the housing, said means being located where the over-all amplitude of the individual undulations in the seating portion is least.

2. An access plate for a housing comprising a body portion; an integral seating portion on one side of the access plate near the periphery thereof, said seating portion being characterized by a series of longitudinally extending undulations each of which is smoothly faired into the undulations preceding and following it in the series; a backing flange on the opposite side of the access plate, portions of said backing flange overlying the undulations in the seating portion of the access plate; and, formed in the body of the backing flange, means accommodating the fastening elements used in holding the access plate in place on the housing, said means being located in zones well removed from those zones in which the over-all amplitude of the individual undulations approaches its maximum.

3. An access plate for a housing comprising a body portion; an integral seating portion on one side of the access plate near the periphery thereof, said seating portion being characterized by a series of longitudinally extending undulations each of which is smoothly faired into the undulations preceding and following it in the series; and, on the opposite side of the access plate, a massive backing flange of solid cross-section overlying the undulations in the seating portion, said backing flange having portions for the application of fastening elements where the undulations in the seating portion are faired into each other.

4. An access plate for a housing comprising a body portion; an integrally-formed encompassing structure at the periphery of the body portion; means forming part of the encompassing structure for attaching the fastening elements used in holding the access plate to the housing; and, at the base of the encompassing structure, a seating surface characterized by a succession of smoothly faired undulations each of which extends longitudinally of the seating surface, the over-all amplitude of the undulations in the seating surface reaching its maximum in zones midway between the zones in which the fastening elements are attached.

5. An access plate as in claim 4 in which the pattern of the individual undulations is that of a shallow catenary.

6. An access plate as in claim 4 in which the undulations present a scalloped pattern.

7. An access plate for a housing comprising a body portion; a seating surface extending inward for a short distance from the periphery of the access plate; openings in the access plate at predetermined intervals along the seating surface; and, formed in the seating surface and centered in the stretches between adjacent openings, longitudinally bowed portions having a radius of curvature so great that they are scarcely perceptible to the eye but effective nevertheless in making pre-sealing contact with the housing.

8. An access plate for a housing comprising a body portion; an integrally-formed encompassing structure at the periphery of the body portion; means in the encompassing structure for accommodating the fastening elements used in attaching the access plate to the housing, said means taking the form of openings at intervals along the encompassing structure; and, centered in the stretches between the openings, smoothly faired longitudinally bowed portions extending along the base of the encompassing structure, said smoothly faired longitudinally bowed portions forming part of the seating surface of the access plate.

9. An access plate for a housing having a generally flat body portion; a transversely projecting portion outlining the periphery of the body portion; a seating portion at the base of the transversely projecting portion; a series of smoothly faired undulations each of which extends longitudinally of the seating portions; and, between undulations, means accommodating the fastening elements used for holding the access plate to the housing.

References Cited in the file of this patent

UNITED STATES PATENTS

| Number | Name | Date |
|---|---|---|
| 781,080 | Lynch | Jan. 31, 1905 |
| 1,961,121 | Knapp | May 29, 1934 |
| 2,035,057 | Farmer | Mar. 24, 1936 |
| 2,272,178 | McDowell et al. | Feb. 10, 1942 |